Jan. 4, 1966  R. R. HANSON  3,226,938
AIR-CONDITIONING SYSTEMS FOR ENCLOSED
SPACES SUCH AS AUTOMOBILES
Filed May 14, 1962  3 Sheets-Sheet 1

INVENTOR.
ROY R. HANSON
BY
Alfred W. Petchaft
ATTORNEY

INVENTOR.
ROY R. HANSON
BY
ATTORNEY

INVENTOR.
ROY R. HANSON

United States Patent Office 3,226,938
Patented Jan. 4, 1966

3,226,938
AIR-CONDITIONING SYSTEMS FOR ENCLOSED SPACES SUCH AS AUTOMOBILES
Roy R. Hanson, Maryland Heights, Mo., assignor of one-fourth to William H. Anderson, Glencoe, Mo., one-fourth to Joseph H. Schierman, and one-fourth to George A. Blase, both of St. Louis, Mo.
Filed May 14, 1962, Ser. No. 194,297
21 Claims. (Cl. 62—174)

This invention relates in general to certain new and useful improvements in air-conditioning systems and, more particularly, to an air-conditioning system for enclosed spaces, such as automobiles, and the like.

The conventional air-conditioning and refrigeration systems presently used in automotive vehicles consist of a two speed electrically driven cold air blower. The blower is provided with its own internal electric motor which is electrically connected to the battery or generating system of the automotive vehicle. This design is rather undesirable in that the air-conditioning unit creates a large drain on the electrical system and especially the battery of the automotive vehicle. This is particularly true when the engine of the vehicle is operating at idling speeds.

There have been certain attempts to operatively connect vehicle air-conditioners to the drive shaft or flywheel of an automotive vehicle. These attempts have proved to be undesirable in that the air that flows across the evaporator and into and out of the passenger compartment is propelled by a blower which is driven by the engine. Since the speed of the engine varies greatly in the ordinary operation of a vehicle, the amount of air that flows into and out of the passenger compartment will also vary greatly. The controls presently used are temperature-responsive and, therefore, do not compensate efficiently for sudden changes in air velocity. Consequently, if the blower speed fluctuates responsive to the changes in the engine speed, the wide variation in air velocity through the passenger compartment will thereupon produce great fluctuations in temperatures which cannot be controlled effectively by presently existing control devices.

In order to eliminate the undesirable situation, various types of expansion valves have been interposed between the condenser and the evaporator to separate the gas from the liquid passing through the evaporator and thereby maintain more control over the air-conditioning system. In addition, various controls are interposed in the "low-side" in order to regulate the amount of gas being returned to the compressor. These controls are rather expensive, not very effective, and often break down after a short period of use. Moreover, such controls do not effectively compensate for rapid changes in air-flow to the passenger compartment and, therefore, do not maintain a constant temperature therein.

It is therefore, the primary object of the present invention to provide an air-conditioning system for automotive vehicles which combines various components of such air-conditioning system into an efficient compact, and self-contained unit.

It is another object of the present invention to provide an air-conditioning system of the type stated which operates with a full-flooded evaporator thereby increasing the overall heat-exchange coefficient and effecting better heat-transfer in the evaporator.

It is an additional object of the present invention to provide an air-conditioning system of the type stated employing low-side and high-side refrigerant controls which are modulating in their action and which return the flash gas refrigerant from the evaporator directly to the compressor, thereby eliminating the need of a surge tank.

It is a further object of the present invention to provide an air-conditioning system of the type stated which requires only one refrigerant control, one temperature control, one capacity control, and one air volume control.

It is also an object of the present invention to provide an air-conditioning system of the type stated which will maintain a relatively constant temperature within the passenger compartment of the automative vehicle, notwithstanding wide variations in engine speed.

It is yet another object of the present invention to provide an air-conditioning system of the type stated which is light in weight, sturdy in construction, and economical to manufacture.

Wth the above and other objects in view, my invention resides in the novel features of form, construction, arrangement, and combination of parts presently described and pointed out in the claims.

In the accompanying drawings (three sheets)—

Figures 1, 2, 3:
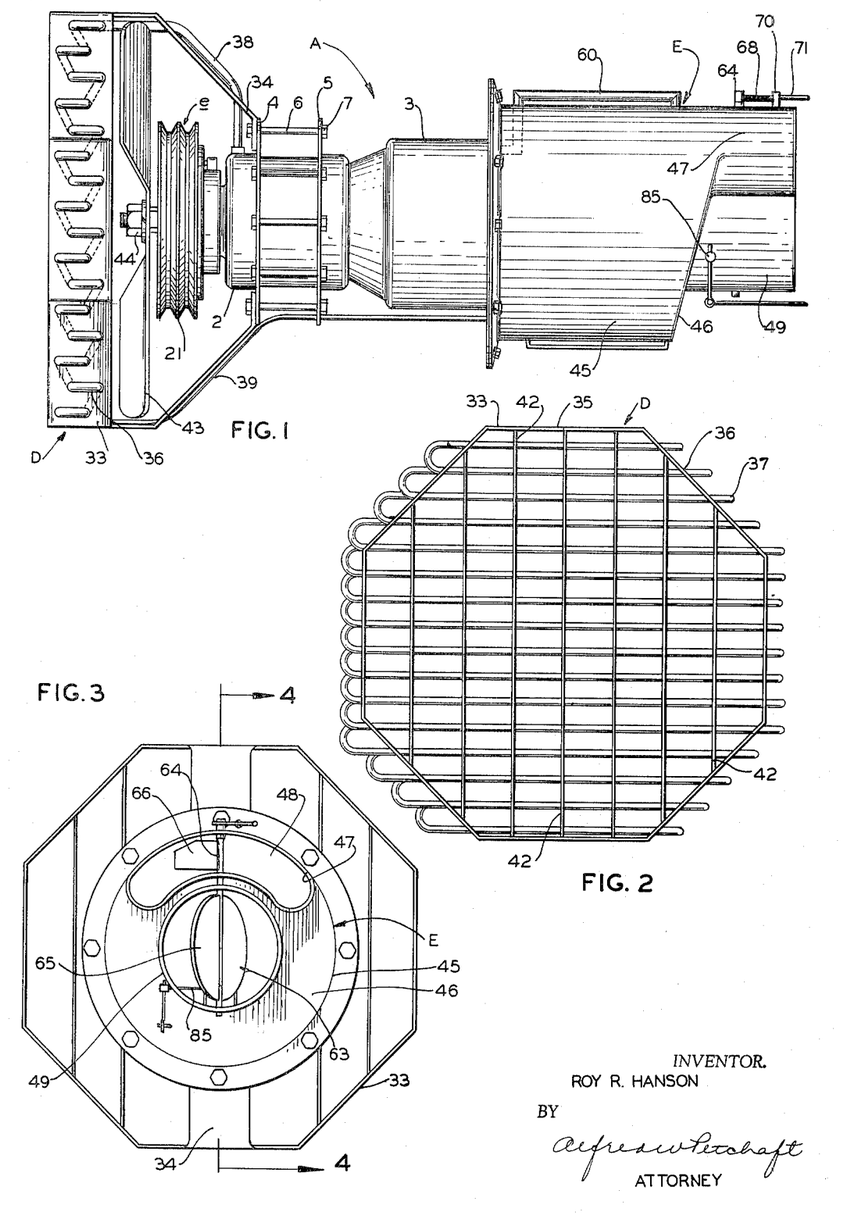
FIG. 1 is a side elevational view of an air-conditioning system for automotive vehicles constructed in accordance with and embodying the present invention.
FIG. 2 is a left side elevational view of the air-conditioning system of FIG. 1.
FIG. 3 is a right side elevational view of the air-conditioning system of FIG. 1.

Referring now in more detail and by reference characters to the drawings which illustrate a preferred embodiment of the present invention, A designates an air-conditioning unit comprising a compressor 1 interposed between and supported by a compressor support housing 2 and a control system housing 3. The housings 2, 3, are formed from sheet metal stampings and integrally include matching outwardly extending flanges 4, 5, suitably apertured to accommodate elongated bolts 6 and nuts 7, by which the air-conditioning unit A is held in assembled relaion, substantially as shown in FIG. 1.

Figure 8:
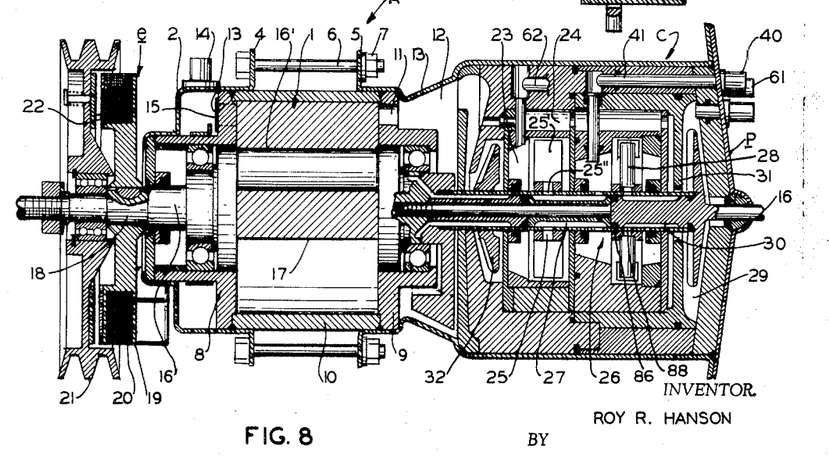
FIG. 8 is a vertical sectional view of the compressor and control device forming part of the present invention.

The compressor 1 comprises a pair of spaced circular end plates 8, 9, which are annularly grooved at their peripheral margins for the accommodation of a cylindrical compressor casing 10. By reference to FIG. 8, it can be seen that the end plate 9 is provided with a low-side inlet port 11 which communicates with a low-side or low-pressure gaseous refrigerant chamber 12, and the end plate 8 is provided with a high-side or high-pressure discharge aperture 13 which communicates with a high-pressure outlet port 14 through a check-valve 15. Extending axially through the compressor casing 10 and the housings 2, 3, is a rotatable shaft 16 which is provided with an offset or eccentrically located portion 16' and rotatably mounted thereon is a cylindrical compressor rotor 17. The operation and structure of the compressor 1 and related components thereof is more fully described in the United States Letters Patent No. 3,001,384 and in my co-pending application Serial No. 102,060, filed April 10, 1961, and is, therefore, neither illustrated nor described in detail herein.

The shaft 16 extends forwardly of the housing 2 (reference being made to FIGS. 1 and 8) and mounted on a diametrically reduced portion 18 is a conventional electromagnetic clutch e which includes a flywheel 19 keyed to the reduced portion 18 and having an annular electromagnetic coil 20. Journaled on the reduced portion 18 is a V-belt pulley 21 having an annular forwardly biased clutch ring 22 and trained around the pulley 21 is a V-belt (not shown) whereby the pulley 21 may be driven by a suitable prime mover such as an automobile engine (not shown). The operation and construction of the electromagnetic clutch e is conventional and, therefore, neither illustrated nor described in detail herein.

Mounted within the outer housing 3 and retained by an end plate p which is bolted to the rearward end of the housing 3 is a control device C, the construction and operation of which is more fully described in my co-pending application Serial No. 178,930, filed March 12, 1962, and, therefore, neither illustrated nor described in detail herein. However, for purposes of the present invention it will suffice to point out that the control device C is provided with a low-side liquid overflow chamber 23 which communicates through a flash gas and oil passageway 24 with the low-pressure gaseous refrigerant chamber 12. Mounted within the chamber 23 is a capacity control valve 25 which permits communication with a high-side liquid refrigerant chamber 26 through a gas bypass duct 27. Mounted within the liquid refrigerant chamber 26 is a liquid refrigerant control valve 28 which permits communication with a pumping chamber 29 through a liquid bypass duct 30. The control device C is also provided with an oil separator 31 interposed between the high-side chamber 26 and the pumping chamber 29 causing low pressure gas and entrained oil to pass through the flash gas and oil passageway 24 and maintaining the low pressure liquid refrigerant within the pumping chamber 29. The control device C is furthermore provided with an oil reservoir and pump 32, which communicates with the flash gas and oil passageway 24.

Mounted on the flange 4 and extending forwardly therefrom is a condenser support 33 having a pair of spider legs 34, and mounted on the support 33 is a condenser D including a hexagonally shaped open ended condenser frame 35 which is provided with a plurality of elongated apertures 36 in its peripheral walls for supporting a convoluted condenser coil 37, the upper end of which is connected to the high-side discharge port 14 by means of a high-side gas tube 38. The lower end of the condenser coil 37 is connected to a high-side liquid refrigerant line 39 which is connected to a high-side inlet port 40 formed on the control housing 3 and which communicates through a duct 41 with the high-side liquid refrigerant chamber 26. Mounted on the forward margin of the condenser frame 35 is a plurality of vertically extending air fins 42. Mounted on the diametrically reduced portion 18 of the shaft 16 is a fan blade 43 which is retained by a nut 44, for purposes of providing a continual air flow across the convoluted condenser soil 37.

While FIGS. 1 and 2 show the condenser frame 35 having open spaces between each of the convolutions of the condenser coil 37, it is contemplated that these areas can be packed with a metal wool, such as aluminum wool, steel wool, or copper wool, for maintaining a higher heat transfer coefficient and a better degree of heat transfer between the condenser coil 37 and the cooling media. It should be understood, that the wool would be loosely packed within the frame 35 so as not to impede the air flow across the condenser coil and yet packed as a continuous tightly-woven bundle in order to prevent any of the fibers of the wool from being drawn into the fan blade 43.

Mounted on and supported by the end plate p and extending rearwardly therefrom is an evaporator E which consists of a cylindrical outer housing 45 having an inclined end wall 46. The housing 45 is integrally formed with a rearwardly extending arcuately shaped discharge port 47 having discharge aperture 48, the port 47 being seized to accommodate a standard type of rubber hose or fitting commonly used in automotive vehicles and the like, so that the discharge port 47 can be connected to the passenger compartment or other media to be cooled or conditioned (not shown). Mounted in the end wall 46 is an open ended tubular sleeve 49 which serves as an air intake chamber 50, the sleeve 49 terminating inwardly of the housing 45 in a heat-exchange chamber 51. The sleeve 49 also projects outwardly of the end wall in the provision of an air-inlet port 52 having a circular inlet aperture 53 and which is sized to accommodate a standard rubber hose or pipe fitting used in automotive vehicles and the like for connection to the passenger compartment or other media to be cooled or conditioned.

The air to be conditioned is drawn into the evaporator E through the air-inlet chamber 50 by means of an exhaust fan or blower 54 which is mounted on an extended end of the rotatable shaft 16 and retained thereon by means of a nut 55. The shaft 16 extends through an aperture formed within the end plate p, and is provided with a sealing ring 56 for maintaining a fluid seal between the control device C and the evaporator E. By reference to FIG. 4, it can be seen that the blower 54 has a portion of its rotating surface removed so that it will, in effect, draw the air from the passenger compartment, into the intake chamber 50 and blow the air around the heat-exchange coils 57, mounted within the heat-exchange chamber 51 and out through the discharge port 47. The lower end of the heat-exchange coils 57 is connected to the liquid refrigerant pumping chamber 29 by means of a liquid refrigerant supply line 58. The liquid refrigerant within the heat-exchange coils 57 will vaporize upon expansion into the high-temperature, low-pressure area, and will pass through the heat-exchange coils 57 through a discharge pipe 59 and into a low-side gas return line 60. The low-pressure return line 60 is connected to a port 61 formed on the housing 1 which is connected to the low-side liquid overflow chamber 23 through a return line 62. It is also contemplated that the open spaces between each of the convolutions of the heat-exchange coils 57 can be packed with a metal wool as in the case of the condenser D, for maintaining higher heat transfer coefficient in the evaporator E.

Figure 4:
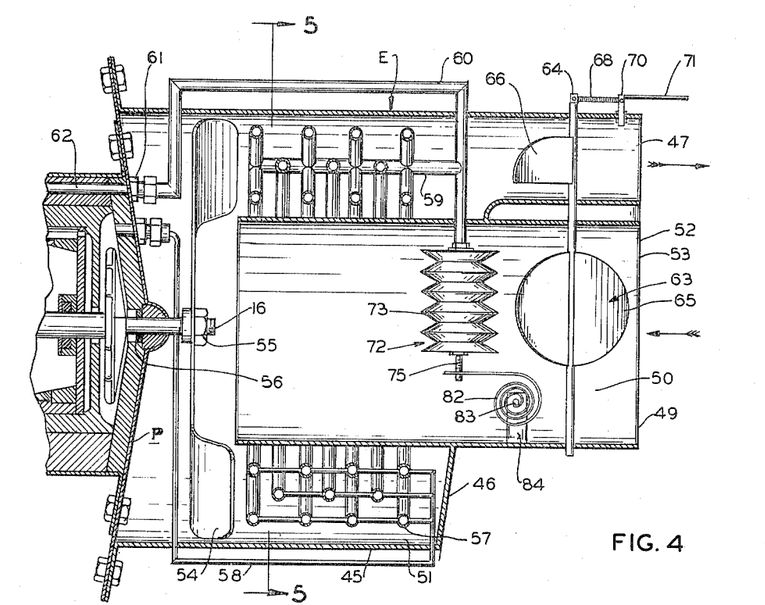
FIG. 4 is a vertical sectional view taken along line 4—4 of FIG. 3.
Figure 5:
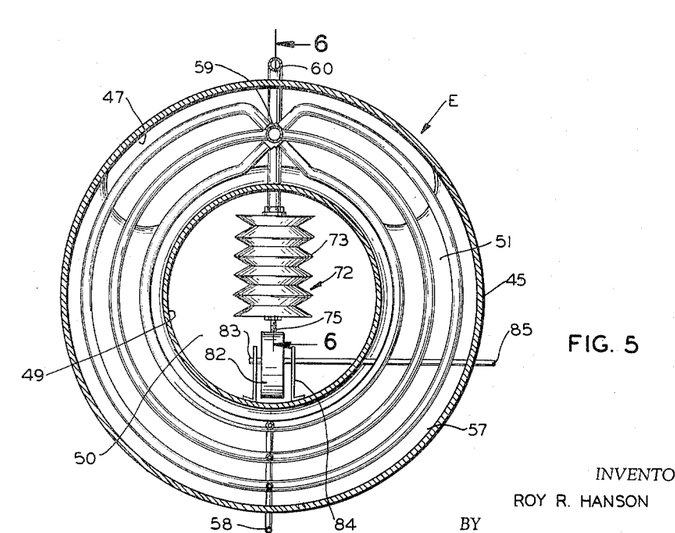
FIG. 5 is a vertical sectional view taken along line 5—5 of FIG. 4.

If the speed of the prime mover, such as the automobile engine (not shown), should vary the blower speed will fluctuate thereby producing fluctuations in the air velocity in the intake chamber 50 and the discharge port 47 and hence causing a fluctuation of temperature in the passenger compartment. Mounted within the intake chamber 50 and the discharge port 47 is an air volume control 63 which includes a vertical shaft 64 which is pivotally mounted in the upper peripheral wall of the discharge port 47 and the lower peripheral wall of the sleeve 49, substantially as shown in FIG. 4. Mounted on the movable with the shaft 64, adjacent the inlet aperture 53 is a flat circular balanced damper 65 which is movable responsive to the flow rate of air in the air-inlet chamber 50. Disposed within the discharge port 47 and mounted on the shaft 64 is a flat unbalanced vane or damper 66 which is angularly rotated approximately forty-five degrees with respect to the flat circular balanced damper 65. Mounted on the upper end of the vertical shaft 64 is a horizontal shaft 67 and connected thereto is a tension spring 68 which is connected at its other end to an actuating rod 69. The actuating rod 69 is pivotally mounted to the other peripheral wall of the discharge port 47 by means of a pin 70, and pivotally connected to the upper end of the actuating rod 69 is an adjusting rod 71 which extends into the passenger compartment and can be suitably provided with an air control or adjusting knob (not shown). Thus, by means of the above-outlined construction, it can be seen that tension on the vertical shaft 64 can be maintained through control in the passenger compartment. The air which is drawn into the intake chamber 50 by the blower 54 is drawn across the balanced damper 65, around the heat-exchange coils 57, and out through the discharge port 47. The conditioned air which is blown across the unbalanced damper 66 will tend to pivot the vane 66 and shaft 64 so that the flat surfaces of the damper 66 are aligned with a plane parallel to the movement of the air in the discharge port 47. As the shaft 64 rotates, the balanced damper 65 will tend to cut off the air coming through the intake chamber 50 through the inlet apertures 53. The amount of angular movement of the shaft 64, can, however, be regulated by maintaining a predetermined tension on the tension spring 68. Thus, the air blowing across the unbalanced damper 66 will tend to pivot the shaft 64 against the action of the tension spring 68 and, as pointed out above, this tension can be controlled from the passenger compartment.

The temperature of the media to be conditioned can be conveniently controlled by means of a temperature control 72 which is disposed within the intake chamber 50 and and responsive to the temperature of the incoming air. The temperature control 72 includes an expansible pneumatic bellows 73 which is secured to a depending end of the low-side gas return line 60 by means of a clamp 74. Disposed within and extending axially through the bellows 73 is an actuating rod 75 which is secured to and movable with the lower end of the bellows 73 by means of nuts 76 and washers 77. Rigidly secured to and movable with the upper end of the actuating rod 75 is an oblique sliding valve 78 having a central bore 79 and a small radial orifice 80 which communicates with the bore 79. By reference to FIG. 6, it can be seen that the sliding valve 78 is adapted to slide within the low-side gas return line 60 and over an aperture 81 formed by the intersection of the evaporator discharge line 59 with the low-side gas return line 60. Thus, by means of the above-outlined construction, it can be seen that any entrained liquid which is carried back with the low-side gas from the evaporator E can be deposited in the bellows 73. The bellows 73 is adapted to expand and contract responsive to the changes in temperature of the incoming air, by means of a spiral-type bimetallic thermostat 82 which is connected to the lower end of the actuating rod 75. The thermostat 82 is mounted on a pin 83 which is, in turn, secured to a bracket 84 mounted on the inwardly presented annular surface of the sleeve 49. Rigidly secured to the pin 83 and extending outwardly of the sleeve 49 is a control rod 85 for adjusting the thermostat 82 to a desired temperature setting. It is, of course, obvious that the control rod 85 should extend into the passenger compartment and can be suitably terminated in a control knob (not shown).

In use, the refrigeration system A can be suitably mounted in any automotive vehicle and the belt driven pulley 21 is connected to the automotive vehicle's engine by a conventional V-belt (not shown). Upon engagement of the clutch e, power will be transmitted through the rotatable shaft 16 through the offset or eccentrically located portion 16', and to the rotor 17 of the compressor 1. The rotation of the shaft 16 will also operate the condenser fan blade 43 and the evaporator blower 54.

During rotation of the compressor rotor 17, the low-pressure gaseous refrigerant within the low-pressure chamber 12 will be blown into the compressor 1 through the inlet port 11 and compressed to condenser pressure where the check-valve 15 will be forced open, permitting the high-pressure gaseous refrigerant to pass through the outlet port 14 into the condenser D. The operation of the compressor 1 is more fully described in the above-mentioned United States Letters Patent No. 3,001,384, and co-pending application Serial No. 102,060, filed April 10, 1961, and is, therefore not fully described in detail herein.

The rotation of the condenser fan blade 43 will draw air in through the condenser D and in heat-exchange relation to the condenser coil 37. The gaseous refrigerant which has been pressurized to a point below its critical pressure is thereupon condensed to a liquid state and returned to the control device C through the high-side liquid refrigerant line 39. The liquid refrigerant is introduced into the high-side liquid refrigerant chamber 26 through the high-side duct 41. As a sufficient amount of liquid refrigerant has accumulated within the high-side chamber 26, the control valve 28 will open permitting fluid within the chamber 26 to pass through the bypass duct 30 into the pumping chamber 29, where the liquid refrigerant is thereupon pumped to the heat-exchange coils 57 in the evaporator E through the liquid refrigerant supply line 58.

The blower 54 will exhaust the air from the media to be conditioned and draw the air through the air intake chamber 50 and blow the air across the heat-exchange coils 57. The liquid refrigerant within the heat-exchange coils 57 will absorb the heat content of the air and thereupon expand into a gaseous state, while cooling the air to be recycled to the media from which it is drawn. The air will then be blown past the unbalanced damper 66 through the discharge port 47 and into such media.

Since the unbalanced damper 66 is rotated approximately forty-five degrees with respect to the balanced damper 65, a large quantity of air passing the unbalanced damper 66 will tend to close the inlet aperture 53. The amount of tension on the spring 68 and, therefore, the tendency of the balanced damper to close can be regulated maintaining a preselected setting on the air volume control 63 through the adjusting rod 71. If the automotive vehicle is traveling at high speed, the blower 54 will draw the air from the media at a rather high rate and recycle into such media at a high rate. The balanced damper 65 will be partially closed and, therefore, tend to cut down the flow of air to the evaporator E. If the speed of the automotive vehicle is suddenly reduced, the blower 54 will rotate at a slower speed and draw less air from the passenger compartment. The unbalanced damper 66 will tend to partially close the discharge port 47 because of the tension of the tension spring 68. This will, of course, open the inlet aperture 53 permitting more air from the media or passenger compartment to flow into the evaporator E. By means of the above-outlined construction, it can be seen that the flow of air into and out of the passenger compartment is maintained at a constant velocity, irrespective of the speed of the prime mover or automotive vehicle.

This liquid refrigerant which has evaporated in the heat-exchange coils 57 is then pased into the evaporator discharge pipe 59 and into the low-side gas return line 60. The low-pressure gas is then returned to the low-side liquid overflow chamber 23 through the return line 62. The low-pressure gas will be withdrawn from the chamber 23 through the flash gas and oil passageway 24 and into the low-pressure gaseous refrigerant chamber 12, where it is thereupon recycled into the compressor 1.

As long as the refrigerant returned to the chamber 23 is gas, the capacity control valve 25 will remain closed and prevent communication with the high-side chamber 26 through the gas bypass duct 27. The net result is that the entire condensing system is maintained under high pressure and liquid refrigerant is continually delivered to the evaporator E. However, if the low-pressure gas returning from the evaporator E contains any entrained liquid, this liquid will separate from the gas in the liquid overflow chamber 23, causing the capacity control valve 25 to open permitting a reduction of high pressure in the high-side chamber 26. As a result thereof, the back pressure on the condenser D will decrease causing less liquid to be delivered to the high-side chamber 26 and to the evaporator E. This flow of liquid refrigerant to the evaporator E will hence diminish until the evaporator E begins to run "cold." The control device C as more fully described in co-pending application Serial No. 178,930, filed March 12, 1962, and as heretofore noted includes a capacity control valve 25 which is operatively mounted on the rotatable shaft 16 and has hollow spring-biased liquid scooping arms 25' which extend radially from the shaft 16. When the scooping arms 25' contact liquid, they start to impart their angular velocity on the liquids. The reactive force exerted by the liquid forces the hollow scooping arms 25' to become unbiased and to communicate with apertures 25'' which communicate with the bypass duct 27. This allows the liquid in the chamber 23 to discharge into the bypass duct 27. When the refrigerant is completely in the gaseous state, the reactive forces are not large enough to unbias the scooping arms 25' and the capacity control valve 25 remains in its closed position. The control device C also includes a liquid refrigerant control valve 28 operatively mounted on the rotatable shaft 16 which has a support ring 86 and two hollow spring biased liquid scooping arms 87 extending radially from the shaft 16. The hollow scooping arms 87 are biased in the direction of shaft rotation and communicate with radial apertures 88 formed within the support ring 86. Thus, when the scooping arms 87 contact liquid, they tend to impart their angular velocity on such liquids. This creates a reactive force by the liquid which forces the hollow scooping arms 87 to become unbiased and communicate with radial apertures 88 formed within the support ring 86, which, in turn, communicates with the liquid bypass duct 30. This allows the liquid in the chamber 26 to discharge into the bypass duct 30. It should be noted that when the refrigerant is completely in the gaseous state, the abovementioned reactive forces are not large enough to unbias the scooping arms 87, and the liquid refrigerant control valve 28 is in its closed position. It is also to be noted that excess liquid refrigerant carried by the low-pressure gas will be deposited in the bellows 73.

As long as the condensed liquid is entirely liquid, it will flow through the high-side liquid refrigerant line 39 into the high-side chamber 26, thence to the pumping chamber 29 and to the evaporator E, causing a full-flooded condition. However, of the condensed liquid returning from the condenser D contains any entrained gas, which may be due to a momentary overloading on the condenser D or to an increased load on the evaporator E, the system will begin to run "gassy." The net effect will be a high-pressure gas build-up throughout the entire condensing system, which will produce a higher degree of liquification of the refrigerant. This will, in effect, counteract the gassy condition by causing the high-side of the system to undergo a sufficent pressure increase in order to increase condensation in the condenser D. If the condenser D is then producing too much liquid refrigerant, which will not be used by the evaporator E, this liquid refrigerant will be returned to the low-side liquid overflow chamber 23 causing a decrease in the pressure of the condensing system as previously described, causing the system to maintain itself in a steady state.

Figures 6, 7:
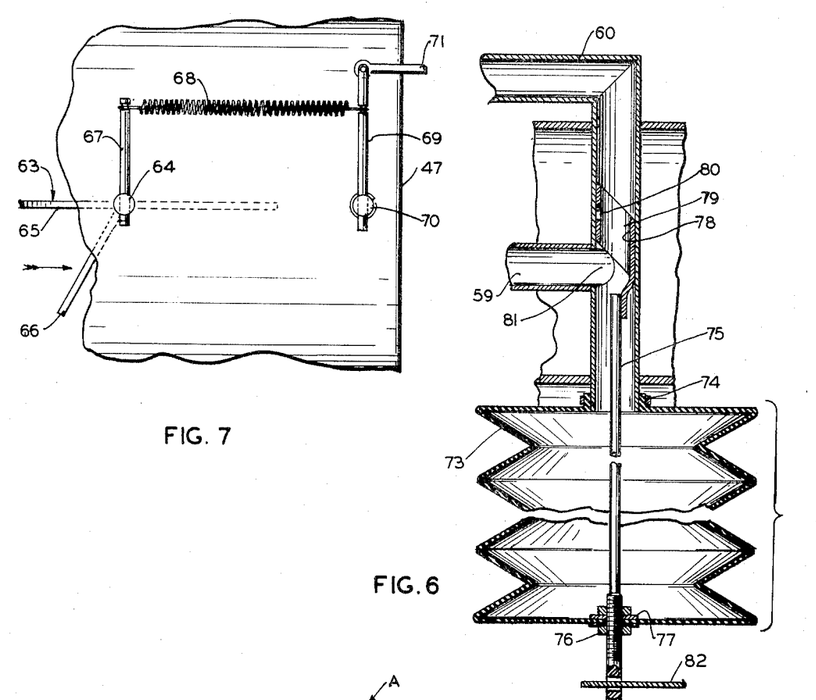
FIG. 6 is a fragmentary sectional view taken along line 6—6 of FIG. 5.
FIG. 7 is a top plan view of the air volume control forming part of the present invention.

The desired temperature of the passenger compartment or media that is conditioned is maintained by correctly setting the thermostat 82 to a predetermined temperature position. This will, in effect, establish the degree of expansion for the bellows 73. The temperature control 72 further provides a method for maintaining the temperature of the passenger compartment constant in addition to the control device C. Referring to FIGS. 4 and 6, it can be seen that the thermostat 82 will cause the bellows 73 to open or shut responsive to a change in temperature. This will, of course, enable the bellows 73 to accommodate more liquid refrigerant which is carried over from the heat-exchange coils 57. Whenever the evaporator E begins to run "cold," that is to say, whenever the air being cooled by the evaporator E stays cool, so that the load on the evaporator E is accordingly reduced, the evaporator E will begin to operate on a full-flooded basis and return liquid refrigerant to the control device C. However, if the load warms up so that the thermostat 82 is actuated, the bellows 73 will be pulled down so that it is able to accommodate a greater amount of liquid refrigerant. This will immediately cause some of the return flow of liquid from the evaporator E to dump into the increased chamber of the bellows 73. As the chamber of the bellows 73 has expanded due to the action by the thermostat 82 and the increased weight of the liquid refrigerant, the oblique sliding valve will be pulled down and disposed over the aperture 81. The flash gas will only leave the evaporator E through the small radial orifice 80 causing a pressure build-up in the evaporator E. Until the bellows 73 again fills up with liquid, the liquid refrigerant flow to the high-side chamber 26 will be momentarily interrupted and stop the flow of fluid to the pumping chamber 29 and hence to the evaporator E. The condenser D will then begin to operate under increased pressure in order to produce more liquid to back up the load. The result is that the operator E will begin to stabilize at a lower pressure level. Meanwhile, as the temperature of the load moves down to normal, the thermostat 82 will squeeze the bellows and force some of the liquid refrigerant into the low-side gas return line 60 and back into the low-side chamber 23. The oblique sliding valve 78 will be moved upwardly and thereby reduce the pressure in the evaporator E. This will cause the condenser D to operate on a reduced pressure and thereby cause a lessor degree of liquification in the condenser D.

The oblique sliding valve 78 is particularly effective during the start of the refrigeration operation, or during the "cool down" period as it is often referred to in the refrigeration industry. During the "cool down" period, the air drawn into the air intake chamber 50 is warm which will cause the thermostat 82 to expand the bellows 73. The expansion of the bellows 73 will lower the actuating rod 75 and carry therewith the sliding valve 78. When the bellows 73 is expanded to its lowermost position, which is normally the case in the "cool down" period, the valve 78 will be positioned over the aperture 81, all as can best be seen in FIG. 6. This will in effect tend to throttle back the flow of gas returning from the evaporator coils 57 and force the compressor 1 to operate under reduced pressure or possibly even under a vacuum for a short period of time. The flow of gas will not be entirely cut off as the gas will then flow through the discharge line 59, through the orifice 80, the bore 79, and into the low-side gas return line 60. The sliding valve 78 will remain in the position shown in FIG. 6, until the load on the evaporator E is brought down to the correct temperature setting on the thermostat 82 and reasonably close to a stabilization point. As this occurs, the sliding valve 78 will move up to the position presently shown in FIG. 6.

It can be seen by means of the above-outlined construction, that the capacity control valve 25 and the control valve 28 are modulating in their operation and will maintain the capacity of the evaporator E in balance with the load. The temperature control 72 further maintains a constant temperature condition throughout the passenger compartment or media to be conditioned regardless of the speed of the prime mover. The air volume control 63 always maintains a constant flow of air through such media. Such control modulation permits the evaporator E to operate on a full-flooded condition and the condenser D to operate an a dry-wall basis. These conditions have been found to be most suitable for effecting heat-control coefficients and, therefore, a higher efficiency of operation.

It should be understood that changes and modifications in the form, construction, arrangement, and combination of the several parts of the air-conditioning systems for enclosed spaces, such as automobiles, and the like, may be made and substituted for those herein shown without departing from the nature and principle of my invention.

Having thus described my invention, what I claim and desire to secure by Letters Patent is:

1. A refrigeration and air-conditioning device for enclosed spaces such as the passenger compartment of automotive vehicles, said device including a compressor, a condenser operatively connected to said compressor, an evaporator operatively connected to said compressor and condenser, first normally closed valve means interposed between the condenser and evaporator, first dynamically reactive valve means operatively associated with the first valve means for opening said first valve means responsive to the quantity of liquid refrigerant between the condenser and evaporator and thereby regulating the amount of liquid refrigerant delivered to said evaporator, second normally closed valve means interposed between the evaporator and the compressor, second dynamically reactive means operatively associated with the second valve means responsive to the quantity of liquid refrigerant flowing between the evaporator and compressor and thereby regulating the pressure on the high-side of the refrigeration system, and third sliding thermostat driven valve means operatively interposed between said compressor and said evaporator for regulating the amount of low-pressure gas returned to said compressor.

2. A refrigeration and air-conditioning device for enclosed spaces such as the passenger compartment of automotive vehicles, said device including a compressor, a condenser operatively connected to said compressor, an evaporator operatively connected to said compressor and condenser, first normally closed valve means interposed between the condenser and evaporator, first dynamically reactive valve means operatively associated with the first valve means for opening said first valve means responsive to the quantity of liquid refrigerant between the condenser and evaporator and thereby regulating the amount of liquid refrigerant delivered to said evaporator, second normally closed valve means interposed between the evaporator and the compressor, second dynamically reactive means operatively associated with the second valve means responsive to the quantity of liquid refrigerant flowing between the evaporator and compressor and thereby regulating the pressure on the high-side of the refrigeration system, third normally open valve means operatively interposed between said compressor and said evaporator for regulating the amount of low-pressure gas returned to said compressor, and third dynamically reactive means operatively associated with said third valve means and being responsive to the temperature of the incoming air into said evaporator.

3. A refrigeration and air-conditioning device for enclosed spaces such as the passenger compartment of automotive vehicles, said device including a compressor, a condenser operatively connected to said compressor, an evaporator operatively connected to said compressor and condenser, first normally closed valve means interposed between the condenser and evaporator, first dynamically reactive means operatively associated with the first valve means for opening said first valve means responsive to the quantity of liquid refrigerant between the condenser and evaporator and thereby regulating the amount of liquid refrigerant delivered to said evaporator, second normally closed valve means interposed between the evaporator and the compressor, second dynamically reactive means operatively associated with the second valve means responsive to the quantity of liquid refrigerant flowing between the evaporator and compressor and thereby regulating the pressure on the high-side of the refrigeration system, third valve means operatively interposed between said compressor and said evaporator for regulating the amount of low-pressure gas returned to said compressor, and reservoir means operatively connected to said third valve means for opening and closing said third valve means responsive to the amount of liquid refrigerant returned from the evaporator.

4. A refrigeration and air-conditioning device for enclosed spaces such as the passenger compartment of automotive vehicles, said device including a compressor, a condenser operatively connected to said compressor, an evaporator operatively connected to said compressor and condenser, first normally closed valve means interposed between the condenser and evaporator, first dynamically reactive valve means operatively associated with the first valve means for opening said first valve means responsive to the quality of liquid refrigerant between the condenser and evaporator and thereby regulating the amount of liquid refrigerant delivered to said evaporator, second normally closed valve means interposed between the evaporator and the compressor, second dynamically reactive means operatively associated with the second valve means responsive to the quantity of liquid refrigerant between the evaporator and compressor and thereby regulating the pressure on the high-side of the refrigeration system, third valve means operatively interposed between said compressor and said evaporator for regulating the amount of low-pressure gas returned to said compressor, and expansible reservoir means operatively connected to said third valve means for opening and closing said third valve means responsive to the amount of liquid refrigerant returned from the evaporator.

5. A refrigeration and air-conditioning device for enclosed spaces such as the passenger compartment of automotive vehicles, said device including a compressor, a condenser operatively connected to said compressor, an evaporator operatively connected to said compressor and condenser, first normally closed valve means interposed between the condenser and evaporator, first dynamically reactive valve means operatively associated with the first valve means for opening said first valve means responsive to the quantity of liquid refrigerant between the condenser and evaporator and thereby regulating the amount of liquid refrigerant delivered to said evaporator, second normally closed valve means interposed between the evaporator and the compressor, second dynamically reactive means operatively associated with the second valve means responsive to the quantity of liquid refrigerant flowing between the evaporator and compressor and thereby regulating the pressure on the high-side of the refrigeration system, third valve means operatively interposed between said compressor and said evaporator for regulating the amount of low-pressure gas returned to said compressor, expansible reservoir means operatively connected to said third valve means for opening and closing said third valve means responsive to the amount of liquid refrigerant returned from the evaporator, and temperature control means operatively connected to said expansible reservoir means for regulating the size thereof.

6. A refrigeration and air-conditioning device for enclosed spaces such as the passenger compartment of automotive vehicles, said device including a compressor, a condenser operatively connected to said compressor, an evaporator operatively connected to said compressor and condenser, first normally closed valve means interposed between the condenser and evaporator, first dynamically reactive valve means operatively associated with the first valve means for opening said first valve means responsive to the quantity of liquid refrigerant between the condenser and evaporator and thereby regulating the amount of liquid refrigerant delivered to said evaporator, second normally closed valve means interposed between the evaporator and the compressor, second dynamically reactive means operatively associated with the second valve means responsive to the quantity of liquid refrigerant flowing between the evaporator and compressor and thereby regulating the pressure on the high-side of the refrigeration system, third valve means operatively interposed between said compressor and said evaporator for regulating the amount of low-pressure gas returned to said compressor, expansible reservoir means operatively connected to said third valve means for opening and closing said third valve means responsive to the amount of liquid refrigerant returned from the evaporator, temperature control means operatively connected to said expansible reservoir means for regulating the size thereof, and air control means operatively mounted in said evaporator for regulating the inflow and outflow of air to the evaporator.

7. A refrigeration and air-conditioning device for enclosed spaces such as the passenger compartment of automotive vehicles, said device including a compressor, a condenser operatively connected to said compressor, an evaporator operatively connected to said compressor and condenser, a rotatable drive shaft operatively connected to said compressor, condenser and evaporator, first normally closed valve means interposed between the condenser and evaporator, first dynamically reactive valve means operatively associated with the first valve means for opening said first valve means responsive to the quantity of liquid refrigerant between the condenser and evaporator and thereby regulating the amount of liquid refrigerant delivered to said evaporator, second normally closed valve means interposed between the evaporator and the compressor, second dynamically reactive means operatively associated with the second valve means responsive to the quantity of liquid refrigerant flowing between the evaporator and compressor and thereby regulating the pressure on the high-side of the refrigeration system, third valve means operatively interposed between said compressor and said evaporator for regulating the amount of low-pressure gas returned to said compressor, expansible reservoir means operatively connected to said third valve means for opening and closing said third valve means responsive to the amount of liquid refrigerant returned from the evaporator, a housing mounted around the evaporator to define a heat-exchange space through which air can flow in heat-exchange relationship with respect to the evaporator, said housing having an inlet and an outlet, fan means in the housing and driven by the shaft whereby to impel air through the housing from the inlet to the outlet, temperature control means mounted in the housing in proximity to the inlet and being operatively connected to said expansible reservoir means for regulating the size thereof, air control means operatively mounted in said housing for regulating the inflow and outflow of the air moving through the housing, and means responsive to the speed of said drive shaft for regulating the air control means.

8. A refrigeration and air-conditioning device for enclosed spaces such as the passenger compartment of automotive vehicles, said device including a compressor, a condenser operatively connected to said compressor, a condenser fan, an evaporator unit consisting of an evaporator coil and a housing mounted around the evaporator coil to define a heat-exchange space through which air can flow in heat-exchange relationship with respect to the evaporator coil, said housing having an inlet and an outlet, said evaporator coil being operatively connected to said compressor and condenser, an evaporator fan, a rotatable drive shaft extending between and being operatively connected to said evaporator fan, compressor and condenser fan, said evaporator fan being located in said housing for impelling air from the inlet to the outlet, an air control device mounted within said housing and being adapted to regulate the flow of air into said housing responsive to the speed of rotation of said drive shaft, and temperature control means mounted within said housing in proximity to the inlet and being adapted to regulate the flow of liquid refrigerant from said evaporator responsive to the temperature of the incoming air.

9. A refrigeration and air-conditioning device for enclosed spaces such as the passenger compartment of automotive vehicles, said device including a compressor, a condenser operatively connected to said compressor, a condenser fan, an evaporator unit consisting of an evaporator coil and a housing mounted around the evaporator coil to define a heat-exchange space through which air can flow in heat-exchange relationship with respect to the evaporator coil, said housing having an inlet and an outlet, said evaporator coil being operatively connected to said compressor and condenser, an evaporator fan, a rotatable drive shaft extending between and being operatively connected to said evaporator fan, compressor and condenser fan, said evaporator fan being located in said housing for impelling air from the inlet to the outlet an air control device mounted within said housing and being adapted to regulate the flow of air into said housing responsive to the speed of rotation of said drive shaft, and temperature control means mounted within said housing in proximity to the inlet and being adapted to regulate the flow of liquid refrigerant from said evaporator, responsive to the temperature of the incoming air, said temperature control means including an expansible reservoir which is operatively connected to said evaporator and adapted to accommodate liquid refrigerant emitted at the low-pressure side of said evaporator.

10. An evaporator for use with refrigeration systems, said evaporator comprising an outer housing having a circular cross-section and an end wall including an eccentrically located axially extending tubular air outlet duct, an air inlet duct mounted concentrically within the air outlet duct and being substantially smaller in cross-sectional size than the air outlet duct so as to provide a substantially annular air outlet passage which extends externally around the air inlet duct, heat-exchange means mounted within said housing and encircling said inlet duct, variable speed blower means mounted within said housing in contiguous relation to said inlet duct, movable air regulating means operatively associated with the blower means, said blower means being adapted to draw the air in through said inlet duct and exhaust the air over said heat-exchange means and out through said outlet duct, said air regulating means and blower means being adapted to maintain the air leaving the outlet duct at a constant velocity.

11. An evaporator for use with refrigeration systems, said evaporator comprising an outer housing having a circular cross-section and an end wall including an eccentrically located axially extending tubular air outlet duct, an air inlet duct mounted concentrically within the air outlet duct and being substantially smaller in cross-sectional size than the air outlet duct so as to provide a substantially annular air outlet passage which extends externally around the air inlet duct, heat-exchange means mounted within said housing and encircling said inlet duct, a variable speed fan mounted within said housing in contiguous relation to said inlet duct and being adapted for rotatable movement, said fan having a blade length which is larger than the diameter of said air inlet duct, and movable air regulating means operatively associated with the blower means, said fan also having a portion of its blade removed in the area of the air inlet duct so that the fan will draw air in through the air inlet duct and blow the air out through the outlet duct when rotated, said air regulating means and blower means being adapted to maintain the air leaving the outlet duct at a constant velocity.

12. An evaporator for use with refrigeration systems, said evaporator comprising an outer housing having a circular cross-section and an end wall including an eccentrically located axially extending tubular air outlet duct, an air inlet duct mounted concentrically within the air outlet duct and being substantially smaller in cross-sectional size than the air outlet duct so as to provide a substantially annular air outlet passage which extends externally around the air inlet duct, heat-exchange means mounted within said housing and encircling said inlet duct, a fan mounted within said housing in contiguous relation to said inlet duct and being adapted for rotatable movement, said fan having a blade length which is larger than the diameter of said air inlet duct, said fan also having a portion of its blade removed in the area of the air inlet duct so that the fan will draw air in through the air inlet duct and blow the air out at a constant velocity through the outlet duct when rotated, and movable air-regulating means mounted within said housing and being operatively associated with said blower means for regulating the amount of incoming air responsive to the speed of said blower means.

13. An evaporator for use with refrigeration systems, said evaporator comprising an outer housing having a circular cross-section and an end wall including an eccentrically located axially extending tubular air outlet duct, an air inlet duct mounted concentrically within the air outlet duct and being substantially smaller in cross-sectional size than the air outlet duct so as to provide a substantially annular air outlet passage which extends externally around the air inlet duct, heat-exchange means mounted within said housing and encircling said inlet duct, a fan mounted within said housing in contiguous relation to said inlet duct and being adapted for rotatable movement, said fan having a blade length which is larger than the diameter of said air inlet duct, said fan also having a portion of its blade removed in the area of the air inlet duct so that the fan will draw air in through the air inlet duct and blow the air out through the outlet duct when rotated, air-regulating means mounted within said housing and being operatively associated with said blower means for regulating the amount of incoming air responsive to the speed of said blower means, and temperature control means mounted in said air inlet duct for regulating the amount of liquid refrigerant flowing from said heat-exchange means.

14. An evaporator for use with refrigeration systems, said evaporator comprising an outer housing having a circular cross-section and a side wall, said housing including an outwardly extending air outlet port, an air inlet port mounted in said side wall and extending on both sides of said wall, heat-exchange means mounted within said housing and encircling said inlet port, a fan mounted within said housing in contiguous relation to said inlet port and being adapted for rotatable movement, said fan having a blade length which is larger than the diameter of said air inlet port, said fan also having a portion of its blade removed in the area of the air inlet port so that the fan will draw air in through the air inlet port and blow the air out through the outlet port when rotated, air-regulating means mounted within said housing and being operatively associated with said blower means for regulating the amount of incoming air responsive to the speed of said blower means, temperature control means mounted in said air inlet port for regulating the amount of liquid refrigerant flowing from said heat-exchange means, and expansible reservoir means operatively connected to said heat-exchange means and said temperature control means for regulating the amount of liquid refrigerant at the low-side of said heat-exchange means.

15. Control means for use with an evaporator normally used in refrigeration systems, said evaporator including an air-inlet port and an air-outlet port, a heat-exchange coil and a blower; said control means comprising temperature control means disposed within said inlet port and being operatively connected to said heat-exchange coil for regulating the amount of liquid refrigerant in said heat-exchange coil responsive to the temperature of the incoming air, and air-control means disposed within said inlet and outlet ports for regulating the amount of air passed over said heat-exchange coil and being responsive to the speed of said blower.

16. Control means for use with an evaporator normally used in refrigeration systems, said evaporator including an air-inlet port and an air-outlet port, a heat-exchange coil and a blower; said control means comprising temperature control means disposed within said inlet port and being operatively connected to said heat-exchange coil for regulating the amount of liquid refrigerant in said heat-exchange coil responsive to the temperature of the incoming air, said temperature control means including an expansible reservoir for accommodating liquid refrigerant from the discharge side of said heat-exchange coil, and air-control means disposed within said inlet and outlet ports for regulating the amount of air passed over said heat-exchange coil and being responsive to the speed of said blower.

17. Control means for use with an evaporator normally used in refrigeration systems, said evaporator including an air-inlet port and an air-outlet port, a heat-exchange coil and a blower; said control means comprising temperature control means disposed within said inlet port and being operatively connected to said heat-exchange coil for regulating the amount of liquid refrigerant in said heat-exchange coil responsive to the temperature of the incoming air, said temperature control means including an expansible reservoir for accommodating liquid refrigerant from the discharge side of said heat-exchange coil, and air-control means disposed within said evaporator for regulating the amount of air passed over said heat-exchange coil and being responsive to the speed of said blower, said air-control means including a balanced damper disposed within said inlet port and an unbalanced damper disposed within said outlet port and being operatively connected to said balanced damper.

18. Control means for use with an evaporator unit including a blower for creating an airstream which passes through a duct having disposed therein a heat-exchange coil which has a high-pressure refrigerant inlet and a low-pressure refrigerant outlet, said control means being adapted to control the temperature of air discharged from said duct; said control means including a valve interposed in the low-pressure outlet of the heat exchange coil, said valve including a moveable element adapted to control refrigerant flow from the outlet, an expansible bellows having an internal chamber communicating with the outlet of said heat-exchange coil and being operatively connected to said moveable element of the valve, and a thermostat which has essentially a linear coefficient of expansion operatively connected to said expansible bellows for regulating the size of the internal chamber in the bellows, said thermostat being disposed in said duct upstream from said heat exchange coil.

19. Control means for use with an evaporator unit including a blower for creating an airstream which passes through a duct having disposed therein a heat-exchange coil which has a high-pressure refrigerant inlet and a low-pressure refrigerant outlet; said control means being adapted to control the temperature of air discharged from said duct, said control means including a valve interposed in the low-pressure outlet of the heat exchange coil, said valve including a moveable element adapted to control refrigerant flow from the outlet, an expansible bellows having an internal chamber communicating with the outlet of said heat-exchange coil and being operatively connected to said moveable element of the valve, said bellows being located in downwardly spaced relation to the moveable element and low-pressure refrigerant outlet so that liquid refrigerant flowing out of the refrigerant outlet will flow by gravity into the bellows and impose a downwardly shifting force upon the bottom of the bellows, a thermostat which has essentially a linear coefficient of expansion operatively connected to the bottom of said expansible bellows and extending downwardly therefrom for regulating the size of the internal chamber in the bellows, said thermostat being disposed in said duct upstream from said heat exchange coil, and regulatory means operatively connected to said thermostat for setting said thermostat to a predetermined desired setting.

20. Control means according to claim 18 in which the low-pressure refrigerant outlet includes a tubular conduit having a lateral opening through which low-pressure refrigerant can flow and in which the movable element is a tubular sleeve disposed in snug-fitting axially slidable relation within the tubular conduit across the lateral opening therein so as to throttle the flow through such lateral opening into the tubular conduit.

21. Control means according to claim 18 in which the low-pressure outlet includes a tubular conduit having a lateral opening through which low-pressure refrigerant can flow and in which the moveable element is a tubular sleeve disposed in snug-fitting axially slidable relation within the tubular conduit across the lateral opening therein so as to throttle the flow through such lateral opening into the tubular conduit, said tubular sleeve being provided with a small-bore lateral opening located so as to be in registration with the lateral opening in the tubular conduit when the sleeve is shifted into pressure-forming position across the lateral opening in the tubular conduit whereby to permit a small restricted flow of refrigerant to pass into the tubular conduit even when the sleeve is positioned entirely across the lateral opening in the conduit.

References Cited by the Examiner

UNITED STATES PATENTS

| | | | |
|---|---|---|---|
| 1,584,243 | 5/1926 | Perkins et al. | 62—499 X |
| 1,889,817 | 12/1932 | Audiffren et al. | 62—499 X |
| 2,082,955 | 6/1937 | Hagen | 230—120 |
| 2,118,292 | 5/1938 | Booth. | |
| 2,187,470 | 1/1940 | Collins | 165—180 X |
| 2,318,393 | 5/1943 | Honerkamp | 62—426 X |
| 2,325,222 | 7/1943 | Bretzlaff et al. | 230—120 X |
| 2,327,841 | 8/1943 | Hagen | 230—120 X |
| 2,397,171 | 3/1946 | Troller et al. | 230—120 X |
| 2,738,652 | 3/1956 | Philipps | 62—243 X |
| 2,743,589 | 5/1956 | Kuempel | 62—243 X |
| 2,795,400 | 6/1957 | Stark | 165—10 X |
| 2,811,841 | 11/1957 | Grimshaw | 62—499 X |
| 2,826,395 | 3/1958 | Petty | 165—96 |
| 2,856,759 | 10/1958 | Barbulesco | 62—225 X |
| 2,881,597 | 4/1959 | Jacobs | 62—243 X |

FOREIGN PATENTS

| | | |
|---|---|---|
| 608,724 | 1/1935 | Germany. |
| 704,319 | 12/1952 | Great Britain. |

ROBERT A. O'LEARY, *Primary Examiner.*

MEYER PERLIN, *Examiner.*